UNITED STATES PATENT OFFICE.

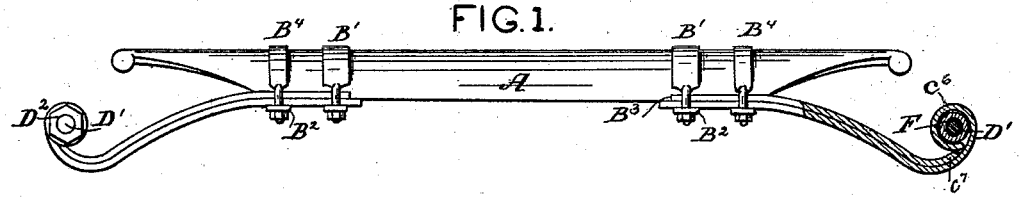
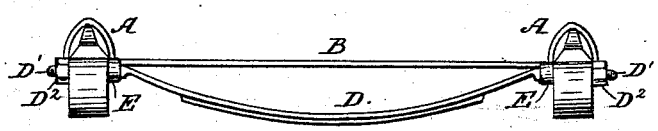
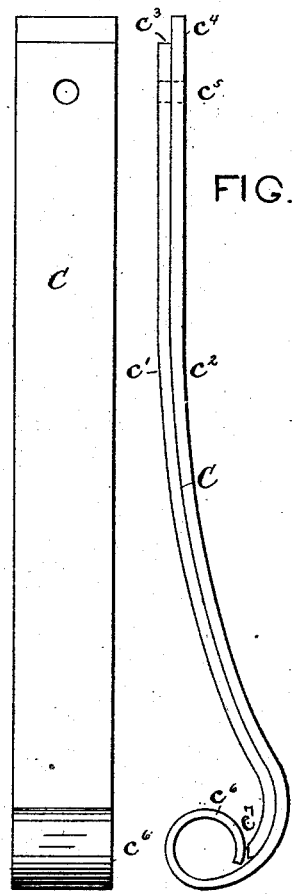
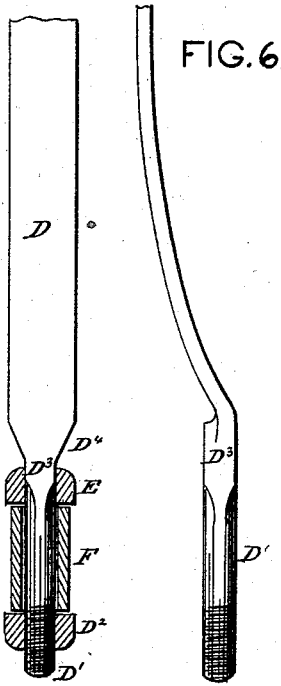
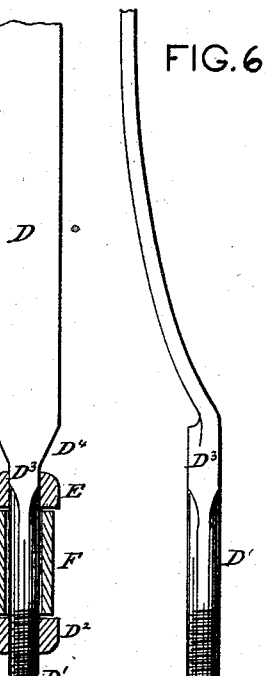
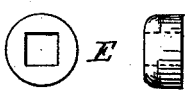
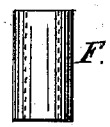

ALPHONSE TETU, OF SEDALIA, MISSOURI.

VEHICLE-SPRING.

SPECIFICATION forming part of Letters Patent No. 232,658, dated September 28, 1880.

Application filed February 16, 1880.

*To all whom it may concern:*

Be it known that I, ALPHONSE TETU, a citizen of the United States, and resident at Sedalia, in the county of Pettis and State of Missouri, have invented certain new and useful Improvements in Buggy or Light-Wagon Springs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish an improved means for connecting the springs to the side bars of a light wagon or buggy.

It consists in the construction and arrangement of the several parts hereinafter fully described, and pointed out in the claim.

In the drawings, Figure 1 shows the curved side springs attached to the side bar. Fig. 2 shows the end spring, with the side springs connected thereto. Fig. 3 is a top view, and Fig. 4 a side view, of one of the side springs, and Figs. 5, 6, 7, 8, and 9 are detail views.

A A are the side bars which support the body of the vehicle, and which are held together by cross-bars B. The cross-bars B have formed on their ends clevis-shaped loops B', which fit over the top of the side bars. They are provided with threaded pins which project below the said side bars, to which they are held by a cross-plate, $B^2$, and nuts, as shown.

C C are the side springs. Each is formed of two leaves, $c'$ $c^2$, the upper of which is made shorter than the under, and is arranged so that its end next the side bar shall form a shoulder, $c^3$, which abuts against a corresponding shoulder, $B^3$, formed on the under side of said side bar. The end $c^4$ of the outer plate or leaf, $c$, extends beyond the shoulder $c^3$, along the under surface of the side bar, and forms, with the shoulders $c^3$ $B^3$, a strong and substantial brace for the inner end of the spring C. There is formed through the two leaves a hole, $c^5$, by which the cross-plate $B^2$ is riveted or bolted to the spring. The outer or free end of the upper or shorter leaf, $c'$, rests on the top of the leaf $c^2$, as shown. The leaf $c^2$ is inclined downward from its fastening on the side bars, and has its outer end bent upward and formed into a loop, $c^6$. The loop $c^6$ is formed so that it rests above and slightly removed from the outer or free end, $c^7$, of the upper leaf, $c'$, which arrangement permits the free action of both leaves when jolts are experienced.

D are the cross-springs, bent downward at their centers, as shown, and which are attached to the running-gears of the vehicle. Each has formed on its outer end the gudgeon D', which are threaded to receive the nut $D^2$.

E is a jam-nut which slips onto the rectangular shank $D^3$, formed on the inner end of the gudgeon D'. It is held immovably in its place by the rectangular shank $D^3$ and the shoulder $D^4$ on the cross-spring.

F is a sleeve, formed to fit snugly in the loop $c^6$ and over the gudgeon D'. It is made slightly less in diameter than the nuts $D^2$ and E, so that the latter extend outward flush with the outer periphery of the loop $c^6$, and thus form bearings or guards to prevent said loops from slipping laterally off the sleeve. The loop $c^6$ is placed on the sleeve F after the latter is slipped onto the gudgeon D'. The use of the sleeve gives a more durable and efficient bearing for the ends of the springs, and also provides easy facilities for the separation of the several parts for repairs or any other desired purpose. The inner ends of the springs are also held by additional stirrup-fastenings $B^4$. The loop $c^6$ is turned inward and over the end $c^7$ of the leaf $c'$ of the side spring, and so that it will catch the said end when the body of the vehicle, in severe jolts, is thrown upward and the gravity or downward pressure is overcome, and the ends of the springs are made to separate. In the ordinary side spring this upward forcible movement is sustained wholly by a single leaf. In my device the leaf $c'$ is brought into play and the force of the jolt is sooner overcome, and less injury is sustained by the spring.

It will be further seen that the sleeve F turns freely on the trunnion D', between the nuts E and $D^2$, and thus provides an attachment between the side and end springs which relieves the trunnion and loop from that severe wear which results where bearing is stationary.

The loop $c^6$, when turned over the end of the leaf $c'$, as described, must be made larger than the loop in the ordinary spring.

The sleeve D' provides an enlarged bearing for the loop without materially increasing the weight of the end spring, D.

It will be further seen that the side spring could be composed of three or more leaves, each leaf having its free end guarded by the overturned loop $c^6$, and the necessary action or movement of one upon the other provided for.

Having thus described my invention, what I claim, and desire to secure by Letters Patent, is—

In the manufacture of springs for vehicles, the end spring, D, having the trunnions D', formed with the rectangular shanks $D^3$ and shoulders $D^4$, the removable jam-nut E, fitting snugly on the shank $D^3$, the loose revolving sleeve F, and nut $D^2$, the said nuts $D^2$ and E being formed so that their peripheries project beyond the peripheries of the loose sleeve F, and all arranged to receive and hold the loop $c^2$ formed on the end of the side spring, $c$, substantially as and for the purposes set forth.

In testimony that I claim the foregoing I have hereunto set my hand this 27th day of December, 1879.

ALPHONSE TETU.

Witnesses:
F. A. SAMPSON,
ROBT. E. FERGUSON.